Aug. 12, 1941.   E. H. BAKER   2,252,339
DRIVING SIGNAL FOR VEHICLES
Filed Aug. 23, 1939   2 Sheets-Sheet 1
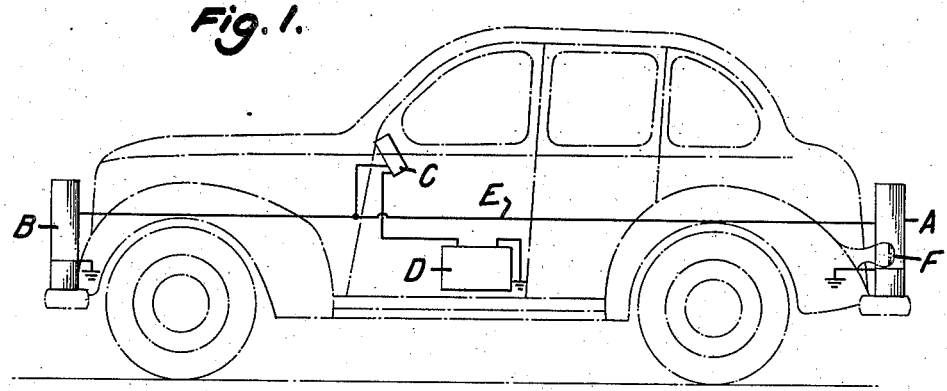
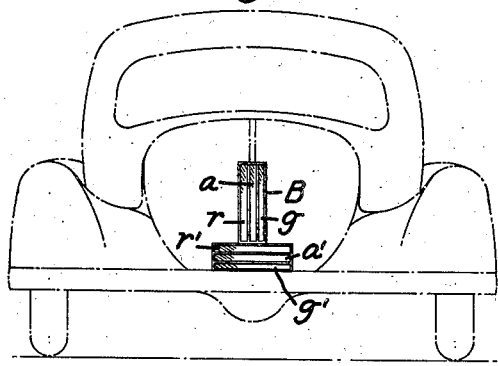   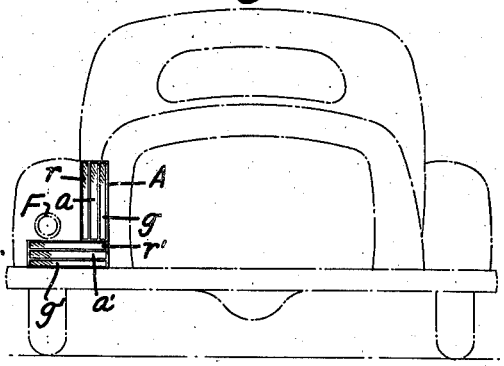
Inventor
Edison H. Baker
By
Attorney Aug. 12, 1941.   E. H. BAKER   2,252,339
DRIVING SIGNAL FOR VEHICLES
Filed Aug. 23, 1939   2 Sheets-Sheet 2
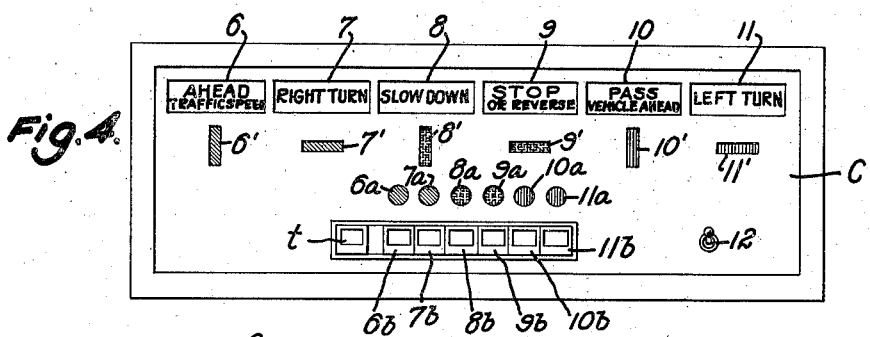
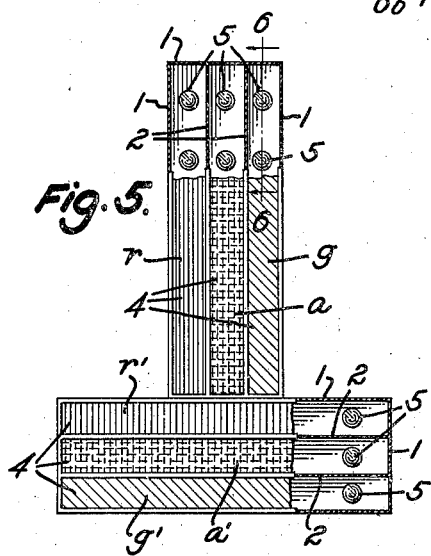
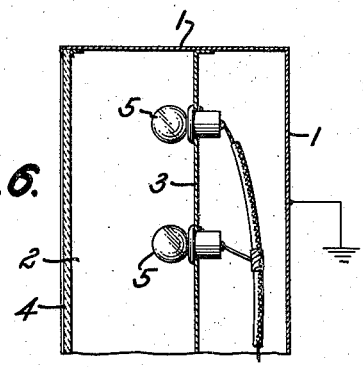
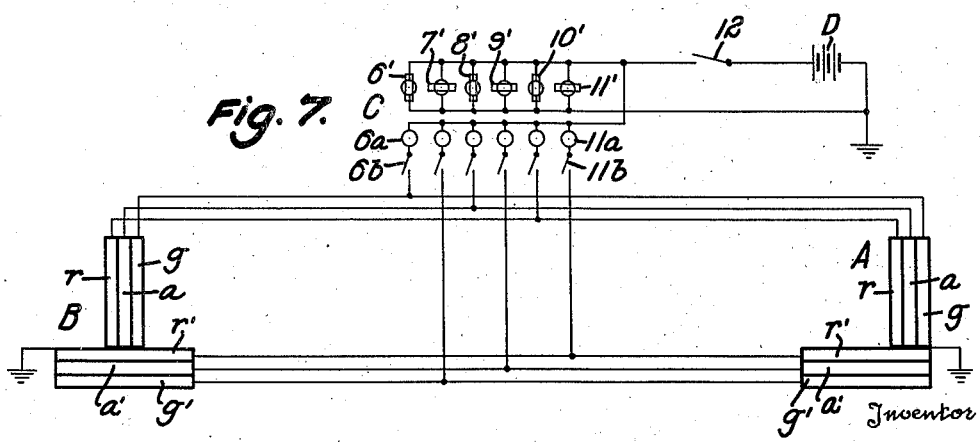
Inventor
Edison H. Baker
By
M. H. Fuelle Jr.
Attorney Patented Aug. 12, 1941

2,252,339

UNITED STATES PATENT OFFICE 2,252,339

DRIVING SIGNAL FOR VEHICLES

Edison H. Baker, New York, N. Y.

Application August 23, 1939, Serial No. 291,609

3 Claims. (Cl. 177—329)

This invention relates to driving signals for vehicles, particularly motor vehicles, and has special reference to signals mounted preferably at the front and rear of such vehicles and serving to apprise other drivers, and pedestrians, of the intentions of the drivers of such vehicles in respect to the operation thereof.

Many types of driving and traffic control signals have been devised, and a number of them have been adopted and are in use, and in such signals variously colored lights have come to be recognized as standard to indicate certain traffic control conditions which approximate conditions of traffic upon railroads by which latter the colors in question were first selected.

In other words, red is universally recognized as a danger signal, amber as a caution signal and green as a safety signal. But in the operation of road or highway vehicles there arise conditions of control which may not be covered by only three major signals, and arrows colored or illuminated in color, and other variously shaped, colored and illuminated signal devices, have been suggested, and to some extent adopted, to meet the need for signals in addition to the three major colored signals mentioned.

Arrows and other specially shaped indicating devices function to some extent satisfactorily in daylight, at relatively short distances, and in the absence of rain and fog. But where adverse weather and traffic conditions exist, and at relatively long distances, it is practically impossible adequately to identify such signal devices.

Among those conditions of vehicle operation of which approaching and following drivers, and pedestrians, should be apprised, are, primarily, the intention of the vehicle operator to stop, to make a left turn, and to pass a vehicle ahead. In addition, it is important that the intention of the vehicle operator to proceed forward at uniform traffic speed, to turn right, and to slow down, be known. These various conditions of vehicle operation have come to be well recognized by experienced drivers, and knowledge of them prior to their actual occurrence will tend to greater traffic safety and increased driving assurance on the part of vehicle operators.

The significance of the colors red, amber and green in indicating danger, caution and safety, respectively, and the almost universal recognition of this significance, have been taken into account in the present invention, and the object of the invention is to provide a driving signal by means of which a number of vehicle control conditions in excess of three may be indicated without increasing the number of colors used.

To this end the invention contemplates a driving signal including two sets of elongated panel or signal members, each set including, preferably, translucent panel elements of the three major colors referred to, red, amber and green, and capable of being separately illuminated so as to increase their visibility, the said sets being arranged with the longitudinal axes of their panels in relative angular arrangement. Preferably one of said sets will be arranged with the longitudinal axes of its panels in a vertical position, and the other set arranged with the longitudinal axes of its panels in a horizontal position, whereby, although panels in each set show the same colors, no two similarly colored panels of the device have their axes in the same position. It is thus possible with the use of only three colors to give six independent visual signals the meaning of which is dependent upon the angular position in which the bar or band of the signal appears to the observer.

Obviously, a certain amount of education of the driving and pedestrian public is necessary before driving signals of the type contemplated by the invention will be fully effective, but the selection of colors for the various signals contemplated by the invention is such that, even though the angular arrangement of the given signal is not fully understood, its color will have a meaning of some effective significance, and after acquisition of sufficient familiarity through use will have full significance.

The preferred horizontal and vertical arrangement of the signal panels will be particularly referred to hereinafter, but the invention is not to be understood as thus limited.

The invention contemplates, also, control means for operating the signal device, including color and other indicia by which the operator of the vehicle carrying the signal is not only aided in its proper and effective operation, but is kept informed of the condition of its operation, all as will be explained hereinafter more fully and finally claimed.

In the accompanying drawings illustrating the invention, in the several figures of which like parts are similarly designated, Figure 1 is a phantom side elevation of an automobile with the device of the invention applied thereto.

Fig. 2 is a front view, and Fig. 3 is a rear view thereof.

Fig. 4 is a front elevation of a suitable control element of panel for the device.

Fig. 5 is a front elevation of a preferred form of signal member according to the invention, with parts broken away.

Fig. 6 is an enlarged fragmentary sectional elevation taken substantially on the line 6—6 of Fig. 5, and Fig. 7 is a wiring diagram.

As illustrated in Figs. 1, 2 and 3 the device of the invention includes a rear signal member A, a front signal member B, a control element C, the ordinary storage battery D and appropriate wiring E, all as will be explained hereinafter in greater detail.

Referring particularly to Figs. 2 and 3, it will be seen that the front signal element B has its panel carrying members in inverted T arrangement, while the rear signal member A is in the form of a reversed L so that it may be placed in a conspicuous position at the rear of the automobile without obscuring the tail light F which projects from the left rear fender. However, if otherwise placed, or if not so placed as to obstruct the tail light, the rear signal member A might be in the same inverted T form as the preferred type of front signal member B.

As shown in Figs. 5 and 6, each signal member (A and B) comprises essentially a casing of the T or L shape referred to including exterior walls 1 and partition members 2 which latter, in combination with the false bottoms or backs 3, divide the casing into three vertically arranged and three horizontally arranged relatively lightproof compartments covered by exposed glass or other translucent panels 4 and fitted for appropriate illumination from within with any suitable type and number of electric lamps 5. Although rows of individual lamps are illustrated in the drawings, it will be apparent that other kinds of illuminating devices, such as neon tubes or fluorescent lamps might be substituted therefor.

Referring particularly to Fig. 5, it will be seen that the translucent elements 4 provide vertical and horizontal red panels $r$ and $r'$, respectively, vertical and horizontal amber panels $a$ and $a'$, respectively, and vertical and horizontal green panels $g$ and $g'$, respectively.

The control element C (Fig. 4) is preferably located upon the dash or instrument board of the automobile, or in such position as to be visible to and within easy reach of the operator, and includes properly illuminated indicia 6, 7, 8, 9, 10 and 11 designing in readily understandable wording the meanings intended to be conveyed by the six individual panel elements $r$—$r'$, $a$—$a'$ and $g$—$g'$ of the signal members. In proximity to the indicia 6 to 11 are arranged appropriately illuminated indicators 6', 7', 8', 9', 10', and 11' in the form of bars extending vertically and horizontally in conformity with the panels of the signal members to which they refer, and colored in the same manner as such panels. The indicia 6 to 11 and indicators 6' to 11' are so wired, as will later appear, as to be continuously illuminated when the vehicle operator so desires, and in order that the operator may tell which, if any, of his signal panels is lighted, appropriately colored and illuminated indicators 6a, 7a, 8a, 9a, 10a and 11a are provided, and these indicators will be illuminated only when appropriate switches controlled by corresponding switch buttons 6b, 7b, 8b, 9b, 10b and 11b are closed. It is preferred that these switches be of that type which upon closure of one will open the others, thus facilitating the operator's switch manipulation and ensuring that only one signal panel will be illuminated at a time in each of the signal elements A and B. There is also a trip button $t$ by which all of the switches may be mechanically re-set to off condition. A main switch 12 is provided for controlling the current supply from the battery D to all of the switches and lamps in the circuit.

As hereinbefore stated, and as will be apparent from an inspection of Fig. 7, when the main control switch 12 is closed the lamps which illuminate the members 6 to 11 and 6' to 11' will be constantly burning. However, the lamps which illuminate the indicators 6a to 11a, and those which illuminate the corresponding signal lamps 5 behind the translucent panels 4 of the signal members A and B at front and rear of the vehicle, respectively, will burn only when their individual switches controlled by the buttons 6b to 11b, respectively, are closed.

Thus, in ordinary operation of the vehicle carrying the signal members, the driver will close the switch 12, and if he is proceeding ahead at normal traffic speed will close the switch of button 6b, thus illuminating the vertically arranged green panel $g$ of each of the signal members A and B. If he intends to make a right turn, he will close the switch of button 7b, thus illuminating the horizontally arranged panels $g'$ of both signal members. If he intends to slow down he will close the switch of button 8b, thus illuminating the vertically arranged amber panels of both signal members. If he intends to stop, or, if standing still, to go into reverse, he will close the switch of button 9b, thus illuminating the horizontal amber panels of both signal members. If, travelling forward, he intends to pass a vehicle ahead of him, he will close the switch of button 10b, thus illuminating the vertical red panels of both signal members. If he intends to make a left turn, he will close the switch of button 11b, thus illuminating the horizontal red panels of both signal members. And it will be understood, as hereinbefore pointed out, that when, after closing one switch, another is closed, the one formerly closed will preferably be released, thus ensuring that only one panel of each signal member is illuminated at a time.

Hence, as hereinbefore stated, the device of the invention makes possible the production of twice as many separate signals, to convey distinct meanings, as there are colors used. Moreover, the signals appear in such form, and in such relative angular arrangement (preferably vertical or horizontal bars or bands), as to be easily visible and distinctive under adverse driving conditions.

It is within the purview of the invention, moreover, that the angularly arranged panel elements of the signal members A and B be separately mounted upon different parts of the vehicle at its front and rear. But it is preferred that they be assembled in the inverted T or reversed L shape shown in the interest of ready observation.

Various changes and modifications other than and in addition to those specifically mentioned are considered to be within the spirit of the invention and the scope of the following claims.

What I claim is:

1. In a driving signal for vehicles, means for displaying an elongated bar of light in any one of a plurality of colors in a predetermined angular position, and means for displaying a similar bar of light in an angular position substantially divergent from the first bar, whereby signals double the number of colors used may be displayed.

2. In a driving signal for vehicles, two similar sets of a plurality of individual elongated signal means capable of separate illumination, each individual signal means of a set capable of displaying a colored bar of light of a color different from the other signal means of said set, the colors used being the same in the two sets, the signal means of each set being arranged in relatively close proximity and the longitudinal axes of similarly colored signal means of the two sets being arranged relatively at a substantial angle, whereby a plurality of signals double the number of such colors may be given by the two sets.

3. In a driving signal for vehicles, means defining a set of at least two elongated signal members in parallel relation and capable of illumination to display differently colored bars of light, a similar set of elongated signal members having its longitudinal axis arranged at a substantial angle with respect to the first set and its signal members capable of displaying bars of light colored the same as those of the first set, whereby distinct signals double the number of the colors used may be displayed.

EDISON H. BAKER.